(12) United States Patent
Bittar et al.

(10) Patent No.: US 9,810,805 B2
(45) Date of Patent: Nov. 7, 2017

(54) METHOD AND APPARATUS TO DETECT A CONDUCTIVE BODY

(75) Inventors: Michael S. Bittar, Houston, TX (US); Jing Li, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 136 days.

(21) Appl. No.: 13/818,380

(22) PCT Filed: Aug. 3, 2011

(86) PCT No.: PCT/US2011/046394
§ 371 (c)(1),
(2), (4) Date: Feb. 22, 2013

(87) PCT Pub. No.: WO2013/019224

PCT Pub. Date: Feb. 7, 2013

(65) Prior Publication Data

US 2013/0154650 A1  Jun. 20, 2013

(51) Int. Cl.
*G01V 3/28* (2006.01)
*G01V 3/26* (2006.01)
(Continued)

(52) U.S. Cl.
CPC .......... *G01V 3/26* (2013.01); *E21B 47/02216* (2013.01); *G06F 17/00* (2013.01)

(58) Field of Classification Search
CPC ... G01V 3/28; G01V 3/30; G01V 3/24; G01V 3/18; G01V 3/38; G01V 3/10; G01V 3/26;
(Continued)

(56) References Cited

U.S. PATENT DOCUMENTS 2,558,972 A * 7/1951 McLaughlin ............ G01V 3/15
324/239
2,746,009 A * 5/1956 McLaughlin ............ G01V 3/26
324/339
(Continued)

FOREIGN PATENT DOCUMENTS

CA WO2009014882 * 1/2009 ............... G01V 3/26
GB 2481493 A 12/2011
(Continued)

OTHER PUBLICATIONS

"International Application Serial No. PCT/US2011/046394, International Preliminary Report on Patentability dated Feb. 13, 2014", 7 pgs.
(Continued)

*Primary Examiner* — Alesa Allgood
(74) *Attorney, Agent, or Firm* — Chamberlain Hrdlicka (57) ABSTRACT

Various embodiments include apparatus and methods to detect and locate conductive bodies and/or provide steam-assisted gravity drainage (SAGD) steering operation. Tools can be configured with receiving sensors (310) arranged to cancel substantially a primary signal associated with a probe signal without rotating the receiving sensors to cancel the primary signal and to capture a secondary signal generated from a conductive body (301) below the earth's surface. Additional apparatus, systems, and methods are disclosed.

29 Claims, 7 Drawing Sheets

(51) Int. Cl.
*E21B 47/022* (2012.01)
*G06F 17/00* (2006.01)

(58) Field of Classification Search
CPC . G01V 3/32; G01R 27/2611; E21B 47/02216; E21B 47/0905; E21B 47/024; E21B 47/122; E21B 43/26; E21B 47/022; E21B 47/02224; E21B 7/04; H01Q 1/04; H01Q 7/00; G01N 1/00

See application file for complete search history.

(56) References Cited

U.S. PATENT DOCUMENTS

| | | | |
|---|---|---|---|
| 4,933,640 A * | 6/1990 | Kuckes | G01V 3/28 166/66.5 |
| 6,163,155 A | 12/2000 | Bittar | |
| 6,476,609 B1 | 11/2002 | Bittar | |
| 7,138,803 B2 | 11/2006 | Bittar | |
| 7,265,552 B2 | 9/2007 | Bittar | |
| 7,557,579 B2 | 7/2009 | Bittar | |
| 7,557,580 B2 | 7/2009 | Bittar | |
| 8,278,928 B2 * | 10/2012 | Bespalov | E21B 43/2406 166/245 |
| 2003/0206138 A1 * | 11/2003 | Chiu | 343/741 |
| 2004/0027131 A1 * | 2/2004 | Bittar | G01V 3/30 324/338 |
| 2005/0212520 A1 * | 9/2005 | Homan | G01V 3/30 324/338 |
| 2007/0137854 A1 * | 6/2007 | Homan | G01V 3/28 166/66 |
| 2008/0030415 A1 * | 2/2008 | Homan et al. | 343/719 |
| 2008/0078580 A1 | 4/2008 | Bittar | |
| 2009/0030615 A1 | 1/2009 | Clark | |
| 2009/0164127 A1 | 6/2009 | Clark | |
| 2009/0224764 A1 | 9/2009 | Bittar | |
| 2009/0302851 A1 | 12/2009 | Bittar et al. | |
| 2009/0309798 A1 | 12/2009 | Bittar et al. | |
| 2010/0000729 A1 | 1/2010 | Alberty | |
| 2010/0117655 A1 | 5/2010 | Bittar et al. | |
| 2010/0123462 A1 | 5/2010 | Bittar | |
| 2010/0332137 A1 | 12/2010 | Meadows et al. | |

FOREIGN PATENT DOCUMENTS

| | | |
|---|---|---|
| GB | 2481495 A | 12/2011 |
| WO | WO-2009014882 A2 | 1/2009 |
| WO | WO-2009091408 A1 | 7/2009 |
| WO | WO-2009/128990 A2 | 10/2009 |
| WO | WO-2009128990 A2 | 10/2009 |
| WO | WO-2010059621 A2 | 5/2010 |
| WO | WO-2013019224 A1 | 2/2013 |

OTHER PUBLICATIONS

"Canadian Application Serial No. 2,810,196, Response filed Sep. 10, 2014 to Office Action dated Mar. 11, 2014", 22 pgs.

"Canadian Application Serial No. 2,810,196, Office Action dated Mar. 11, 2014", 2 pgs.

"International Application No. PCT/US2011/046394, Written Opinion dated Apr. 25, 2012", 5 pgs.

"International Application Serial No. PCT/US2011/046394, Search Report dated Apr. 25, 2012", 5 pgs.

* cited by examiner

METHOD AND APPARATUS TO DETECT A CONDUCTIVE BODY

RELATED APPLICATIONS

This application is an U.S. National Stage Filing under 35 U.S.C. 371 from International Application No. PCT/US2011/046394, filed on 3 Aug. 2011, and published as WO 2013/019224 A1 on 7 Feb. 2013, which application and publication are incorporated herein by reference in their entirety.

TECHNICAL FIELD

The present invention relates generally to apparatus for making measurements related to oil and gas exploration.

BACKGROUND

In drilling wells for oil and gas exploration, understanding the structure and properties of the associated geological formation provides information to aid such exploration. In addition, drilling can be enhanced with systems and methods to detect conductive bodies below the earth's surface. The conductive bodies can include metal piping used in various drilling techniques, where the positioning of the metal piping can be important to the drilling operation.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Figure 1:
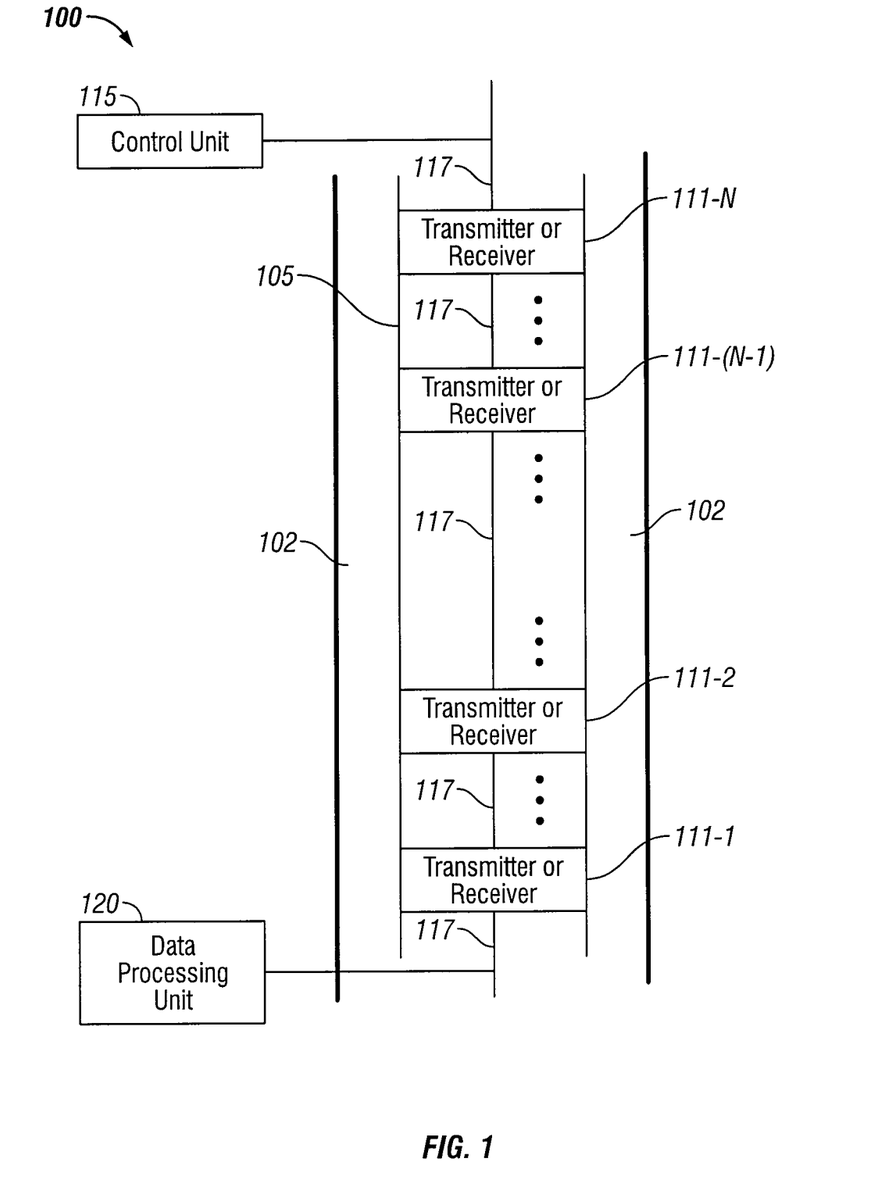
FIG. 1 illustrates an example system to determine a position of a conductive body, in accordance with various embodiments.

FIG. 1 shows a block diagram of an embodiment of a system 100 to determine a position of a conductive body. System 100 includes a tool structure 105 having an arrangement of sensors 111-1, 111-2 . . . 111-(N−1), 111-N along a longitudinal axis 117 of tool structure 105. Each sensor 111-1, 111-2 . . . 111-(N−1), 111-N can be utilized as a transmitting sensor or a receiving sensor under the control of control unit 115. Control unit 115 is operable to manage generation of a probe signal from one or more transmitter sensors in the arrangement of sensors 111-1, 111-2 . . . 111-(N−1), 111-N and to manage collection of received signals at the receiver sensors in the arrangement of sensors 111-1, 111-2 . . . 111-(N−1), 111-N. Control unit 115 is operable to select one or more transmitter sensors from among the sensors in the arrangement of sensors 111-1, 111-2 . . . 111-(N−1), 111-N and to select one or more receiver sensors from among the sensors in the arrangement of sensors 111-1, 111-2 . . . 111-(N−1), 111-N such that the selected receiver sensors are arranged to substantially cancel a primary signal associated with a probe signal generated by a transmitter sensor in the arrangement of sensors 111-1, 111-2 . . . 111-(N−1), 111-N without rotating the receiver sensors to cancel the primary signal and to capture a secondary signal generated from a conductive body below the earth's surface. The primary signal can be cancelled such that the primary signal is completely canceled or cancelled to a level that the primary signal is essentially cancelled. The conductive body is separate from structure 105 by a distance determined from received signals in the arrangement of sensors 111-1, 111-2 . . . 111-(N−1), 111-N. System 100 can include a data processing unit 120 to process the received signals to determine the position of the conductive body The arrangement of sensors 111-1, 111-2 . . . 111-(N−1), 111-N can include, but is not limited to, an arrangement of pairs of receivers that are symmetric to a plane aligned with longitudinal axis 117. The arrangement of pairs of receivers can provide cancellation of a primary magnetic field without rotating the pairs of receivers. The arrangement of sensors 111-1, 111-2 . . . 111-(N−1), 111-N can include a tilted coil installed concentric with tool structure 105, where the tilted coil performs the same as a pair of straight coils in cancellation of a primary magnetic field. For arrangements in which sensors 111-1, 111-2 . . . 111-(N−1), 111-N are tilted, each tilted sensor can be arranged with respect to longitudinal axis 117.

Sensors 111-1, 111-2 . . . 111-(N−1), 111-N can include a variety of different types of receiving sensors. The receiving sensors in sensors 111-1, 111-2 . . . 111-(N−1), 111-N can be realized as any device that measures or collects for processing a magnetic field. For example, coil antennas or magnetometers can be used. Such receiving sensors are configured to measure or collect for processing a magnetic field emitted from a conductive body, as a result of a probe signal generated from a transmitter arranged in sensors 111-1, 111-2 . . . 111-(N−1), 111-N. The probe signal generated from a transmitter arranged in sensors 111-1, 111-2 . . . 111-(N−1), 111-N causes a current to flow in the conductive body. The receiving sensors in sensors 111-1, 111-2 . . . 111-(N−1), 111-N are arranged to collect a magnetic field generated by this current, which provides this secondary field. From the secondary field, the conductive body can be detected. The conductive body may be a casing in formation layers below a surface drilling region. The conductive body may be a casing in formation layers below the bottom of a water region, for example, associated with offshore drilling. The conductive body may include other piping and conductive structures associated with drilling operations.

The transmitting sensor in the arrangement of sensors 111-1, 111-2 . . . 111-(N−1), 111-N can include a focused electric dipole source to induce an electric current in a region exterior 102 to tool structure 105. The receiving sensors in the arrangement of sensors 111-1, 111-2 . . . 111-(N−1), 111-N can include two sets of non-parallel coil antennas. The receiving sensors can include two sets of coil antennas such that the two sets are non-parallel. Each pair of the two sets of non-parallel coil antennas can be symmetrically installed with respect to a plane that is aligned with a longitudinal axis of tool structure 105. The receiving sensors in the arrangement of sensors 111-1, 111-2 . . . 111-(N−1), 111-N can include one or more pairs of tilted coils installed concentric on tool structure 105. The tilted coils in each pair may be oriented orthogonal to each other.

Control unit 115, which manages the generation of transmission signals and which can manage the collection of received signals corresponding to the transmission signals, can conduct the generation of transmission signals to provide signals of different frequencies. The collected received signals can be provided to data processing unit 120 in appropriate format to perform inversion on data generated from signals acquired at receiving sensors in the arrangement of sensors 111-1, 111-2 . . . 111-(N−1), 111-N. Data processing unit 120 can be structured to utilize a forward model to perform the inversion on data generated from signals acquired at receiving antennas. This forward model can be used to determine a distance to a conductive body such as a pipe located below the earth's surface. This distance can be determined as a function of the received signal and resistivity of the formation into which the probe signal is directed. The conductive body to be detected is disposed in formation structure and can be viewed as a formation structure. A look-up table for the distance involving one or more characteristics of the received signal and formation resistivity can be constructed through forward modeling. With such a table, received signals can be matched with entries in the table to determine the distance.

Figure 2:
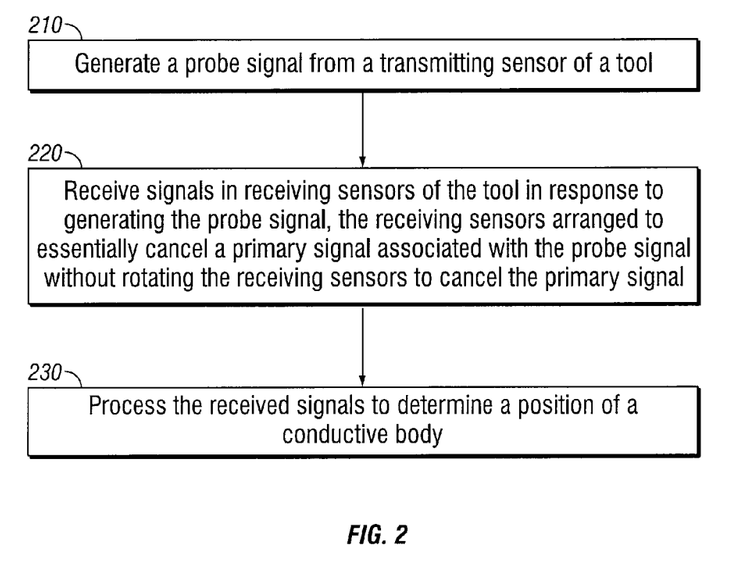
FIG. 2 shows example features of a method to determine a position of a conductive body, in accordance with various embodiments.

FIG. 2 shows example features of an embodiment to determine a position of a conductive body. The conductive body may be a casing, or other piping, located downhole and/or underwater. At 210, a probe signal is generated from a transmitting sensor of a tool. The tool can be disposed below the earth's surface, such as downhole and/or underwater. Generating a probe signal from a transmitting sensor can include using an electric dipole source to induce an electric current in a region outside the tool.

At 220, signals are received in receiving sensors of the tool in response to generating the probe signal, where the receiving sensors are arranged to substantially cancel a primary signal associated with the probe signal without rotating the receiving sensors to cancel the primary signal. The primary signal can be cancelled such that the primary signal is completely canceled or cancelled to a level that the primary signal is essentially cancelled. These receiving sensors can capture a secondary signal generated from the conductive body below the earth's surface. The primary signal can include a primary magnetic field and the secondary signal can include a secondary magnetic field. Receiving signals in receiving sensors of the tool can include using two sets of non-parallel antennas as receiver sensors. Receiving signals in receiving sensors of the tool can include using a single pair of tilted coils installed concentric on a collar on which the tool is mounted. The tilted coils in the single pair can be oriented orthogonal to each other.

At 230, the received signals are processed to determine a position of the conductive body. The tool can be positioned approximately parallel to the conductive body. The tool and the conductive body can be positioned roughly horizontal. The tool and the conductive body can be positioned roughly vertical. The tool can be positioned at different angles with respect to the conductive body. Processing the received signals can include determining an azimuthal angle associated with the conductive body and a distance to the conductive body. Determining the azimuthal angle and the distance can include determining the azimuthal angle and the distance, while the tool is mounted on a non-rotational collar. Processing the received signals can include determining characteristics of the conductive body. Determining characteristics of the conductive body can include whether the conductive body is a casing associated with a well.

In various embodiments, systems and methods are used to provide downhole casing detection, which can include locating the azimuthal angle and the distance of the casing with respect to the tool making the measurements. Coil antennas may be used to pick up magnetic fields. The configuration of the coil antennas can be designed effectively to cancel the primary field associated with activating a transmitter antenna to facilitate the extraction of a secondary field coming from the casing. Two sets of non-parallel antennas as receivers can be used such that the azimuthal angle and the distance to the casing can be calculated while the tool is mounted on a non-rotational collar. The system may include deploying a tool substantially parallel to the casing, or other piping, to be detected, where the tool has receiver antennas arranged to cancel substantially a primary signal without rotating the receiver antennas to cancel the primary signal and to capture a secondary signal generated from the casing, or other piping, below the earth's surface. The primary signal can be cancelled such that the primary signal is completely canceled or cancelled to a level that the primary signal is essentially cancelled. The casing, or other piping, may be positioned in a formation and/or underwater. Such apparatus and methods can also be used for steam-assisted gravity drainage (SAGD) steering.

Typically, a SAGD technique includes using twin wells, one drilled relative to the other. For twin horizontal wells, one well is drilled above the other, and steam injection is used to enhance the recovery of heavy oil. Steam injected to the upper well, for example, provides for heating of oil. The heated heavy oil and condensed steam are produced from the lower well. Such methods can provide reduced oil viscosity, along with improved sweep and displacement efficiency, which can result in a higher percentage of recovery than other traditional methods.

By allowing two or more wellbores to be positioned within extremely tight tolerances, magnetic ranging technology can help eliminate positional uncertainty of conventional surveys and can provide more precise tolerance for SAGD wells. The systems and methods, in accordance with the teaching herein, can be used to provide SAGD steering. Such SAGD steering can be applied to non-horizontal wells.

Various components of a system including a tool, having one or more sensors operable such that selected receiver sensors are arranged to substantially cancel a primary signal, associated with a probe signal generated by a transmitter sensor, without rotating the receiver sensors to cancel the primary signal and to capture a secondary signal generated from a conductive body below the earth's surface, as described herein or in a similar manner, may be realized in combinations of hardware and software based implementations. The primary signal can be cancelled such that the primary signal is completely canceled or cancelled to a level that the primary signal is essentially cancelled. These implementations may include a machine-readable storage device having machine-executable instructions, such as a computer-readable storage device having computer-executable instructions, to generate a probe signal from a transmitting sensor of a tool, which can be disposed below the earth's surface; to receive signals in receiving sensors of the tool in response to generating the probe signal, where the receiving sensors are arranged to cancel substantially a primary signal associated with the probe signal without rotating the receiving sensors to cancel the primary signal and to capture a secondary signal generated from a conductive body below the earth's surface; and to process the received signals to determine a position of the conductive body. The primary signal can be cancelled such that the primary signal is completely canceled or cancelled to a level that the primary signal is essentially cancelled. The instructions can include instructions to manage the tool, detect conductive bodies, and provide SAGD steering operation in accordance with the teachings herein. Further, a machine-readable storage device, herein, is a physical device that stores data represented by physical structure within the device. Examples of machine-readable storage devices include, but are not limited to, read only memory (ROM), random access memory (RAM), a magnetic disk storage device, an optical storage device, a flash memory, and other electronic, magnetic, and/or optical memory devices.

To detect a downhole parallel casing, an effective approach can use a long drilling collar for antennas to inject electric currents into the formation. When the currents hit the casing, a longitudinal current forms along the casing, which generates secondary magnetic fields. The receivers on a tool can pick up the secondary magnetic fields and obtain the casing information by processing received data. Magnetometers have been used as receivers in conventional systems. The magnetic fields in the formation are composed of two components, the primary field generated by the currents on the drilling collar and the secondary field from the casing. The primary field is much stronger than the secondary field such that it may be difficult to extract the secondary field from the signals received by magnetometer receivers in conventional systems.

Figure 3:
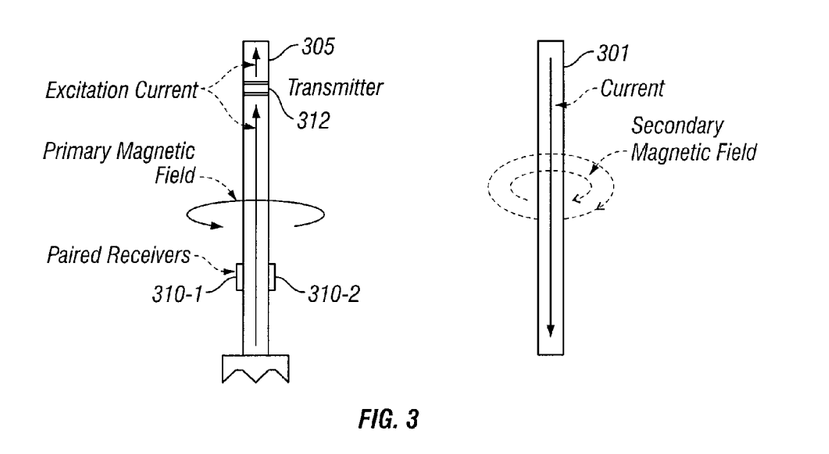
FIG. 3 shows an example of a tool structure to detect a conductive body, in accordance with various embodiments.

FIG. 3 shows an example embodiment of a tool structure 305 to detect a conductive body 301. Paired receivers 310-1 and 310-2 can be used to receive a magnetic field. In some embodiments, magnetometers can be used as paired receivers 310-1 and 310-2. In other embodiments, coil antennas 310-1 and 310-2 can be used to receive a magnetic field rather than magnetometers. Coil antennas 310-1 and 310-2 can be structured as a single tilted coil around the collar or as a pair of plane-symmetrical coils whose moments are perpendicular to the collar axis. As a single tilted coil around the collar or as a pair of plane-symmetrical coils, this tool can be applied on a rotation collar to find and cancel the primary field to locate conductive body 301. Tool structure 305 can include a transmitter 312. In an application, conductive body 301 can be a casing of a drilling operation.

If the collar does not rotate, the magnitude and the source location of the secondary field are not able to be determined using received signals by one pair of coils, that is, the location of the conductive body 301 cannot be determined. In various embodiments, tool 305 can be structured to have at least two pairs of coil antennas. The two pairs can be orthogonal to each other to simplify data processing algorithm. However, the two pairs can be oriented at any angle other than zero degrees. Each pair can be symmetrically installed with respect to a plane that is aligned with the collar axis.

Figure 4:
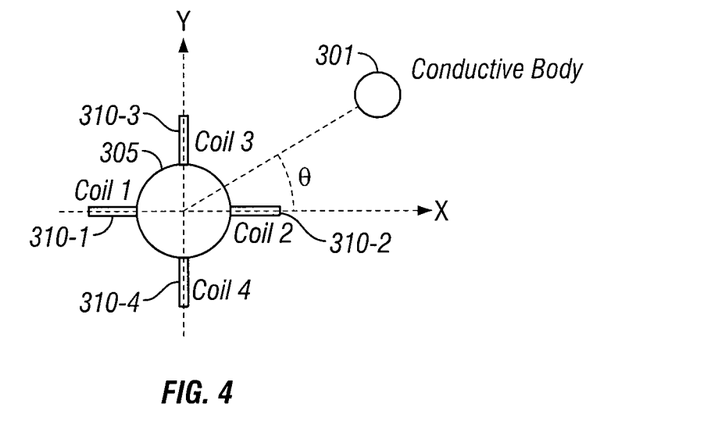
FIG. 4 shows an example of the tool structure of FIG. 3 having two pairs of coil antennas, in accordance with various embodiments.

FIG. 4 shows an example embodiment of tool structure 305 to detect conductive body 301 having two pairs of coil antennas. One pair includes coil antenna 310-1 and coil antenna 310-2 that are symmetrical with respect to the plane YZ. The other pair includes coil antenna 310-3 and coil antenna 310-4 that are symmetrical about the plane XZ. Signals from the paired coil antennas can be combined in the following way, $$V_y = (V_{Coil1} + V_{Coil2})/2 \qquad (1a)$$

$$V_x = (V_{Coil3} + V_{Coil4})/2 \qquad (1b)$$

where $V_x$ and $V_y$ represent the received voltages by coil pair 3-4 and coil pair 1-2, respectively. Based on the orientations of the coils, coil antenna 310-1 and coil antenna 310-2 only receive y-component of the magnetic field, and coil antenna 310-3 and coil antenna 310-4 only receives x-component of the magnetic field. Similar results occur with other types of receiving sensors.

Figure 5:
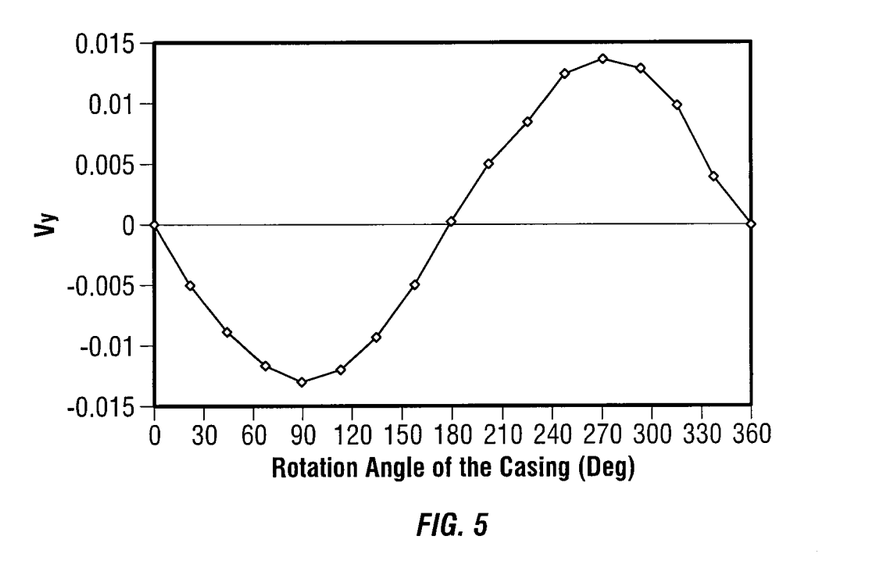
FIG. 5 shows a sinusoidal wave resulting from a received $V_y$ signal corresponding to a tool, such as shown in FIG. 4, at different positions around a conductive body, in accordance with various embodiments.

Physically, the primary magnetic field lies in the O-direction and lies symmetrical around the collar axis. The primary magnetic field is in opposite direction when penetrating the two coils in each pair. Hence, the contribution of the primary magnetic field has been canceled in $V_x$ and $V_y$. On the other hand, the secondary magnetic field from conductive body 301 stays in the same direction at two paired coils, and their contribution to the received voltage remains in $V_x$ and $V_y$. In a homogeneous formation, when the downhole for the tool is strictly parallel to conductive body 301, pure signals from conductive body 301 are provided according to equation 1. Under this condition, if the tool were to rotate around conductive body 301, the received $V_y$ would be a sinusoidal wave as shown in FIG. 5, that is, FIG. 5 shows a sinusoidal wave resulting from a received $V_y$ signal corresponding to a tool, such as shown in FIG. 4, at different positions around conductive body 301. $V_x$ has a similar shape but with 90 degree phase shift. Thus, the received voltages can be used to determine the azimuthal angle of conductive body 301 relative to tool 305.

For the unknown location of a nearby conductive body 301, once the $V_x$ and $V_y$ are measured, the azimuthal angle of conductive body 301 with respect to the x-axis can be determined by equation 2, $$ctg(\theta) = V_y/V_x \qquad (2)$$

where $ctg(\theta)$ denotes the cotangent function of $\theta$, and the maximum value of $V_y$, or the magnitude of the sinusoidal curve in FIG. 5, can be determined by equation 3, $$V_{max} = \sqrt{(V_x^2 + V_y^2)} \qquad (3)$$

Figure 6:
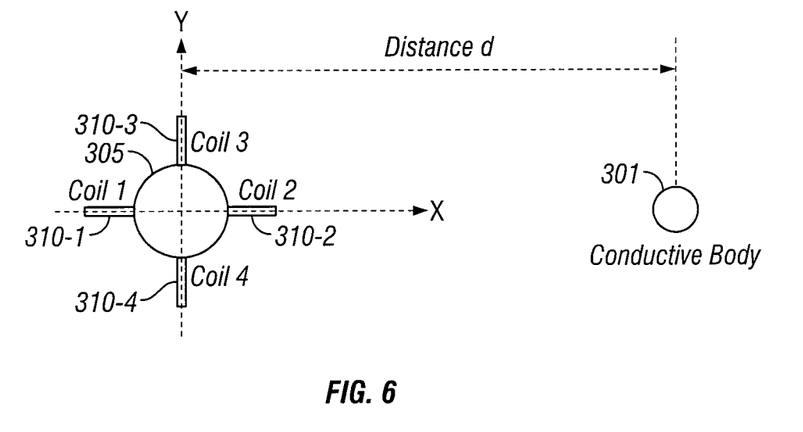
FIG. 6 shows a geometry for modeling a voltage magnitude to distance relation, in accordance with various embodiments.
Figure 7:
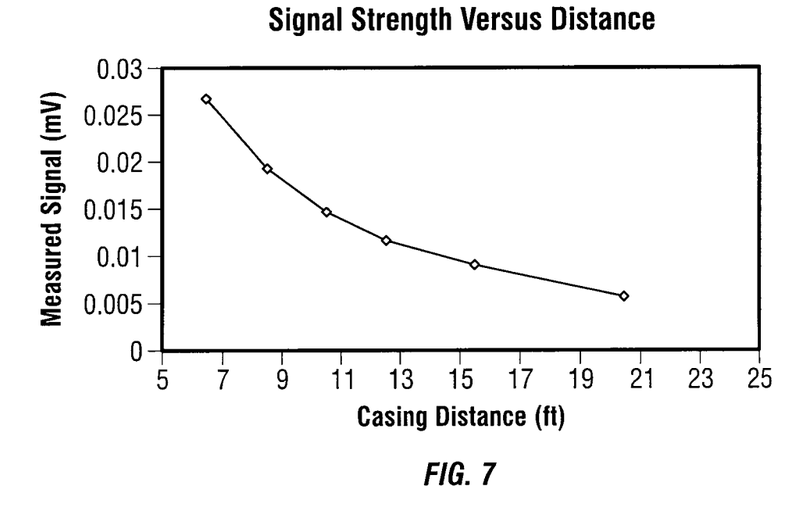
FIG. 7 shows modeled results of a casing as a conductive body in a homogeneous formation, where the casing is located at varying distances from a detecting tool, in accordance with various embodiments.

The magnitude given above is related to the distance of conductive body 301 to tool 305. FIG. 6 shows a geometry for modeling the voltage magnitude to distance relationship. FIG. 7 shows modeled results of a casing as conductive body 301 in a homogeneous formation, where the casing is located at varying distances from the detecting tool.

The distance from tool structure 305 to conductive body 301 can be derived as a function of the measured voltage amplitude and the formation resistivity and dielectric constant, i.e.

$$d = f(V_{max}, R, \varepsilon) \quad (4)$$

$$\approx f(V_{max}, R) \text{ at a low frequency band}$$

A two-dimensional look-up table, in terms of a voltage magnitude and formation resistivity, for the distance can be constructed through forward modeling. A forward model provides a set of mathematical relationships for sensor response that can be applied to determining what a selected sensor would measure in a particular environment, which may include a particular formation. In an application, with conductive body 301 being a casing, the casing distance can be inverted based on the built look-up table by inputting the measured voltage magnitude and the known or derived resistivity.

Figure 8:
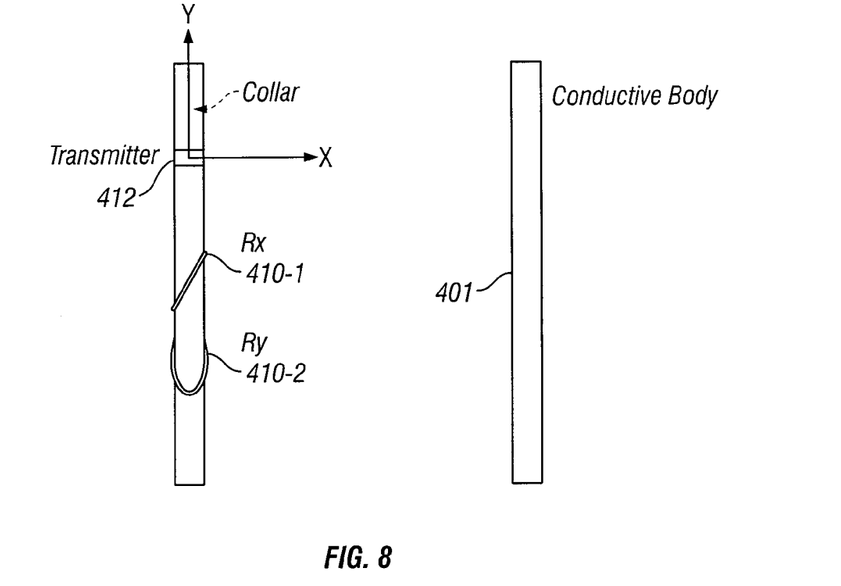
FIG. 8 shows an example of a tool to detect a conductive body using two tilted receiver coils, in accordance with various embodiments.

FIG. 8 shows an example embodiment of a tool to detect a conductive body 401 using two tilted receiver coils. In the above discussions with respect to FIGS. 3, 4, and 6, coil receivers are paired to cancel the effect of the primary magnetic field. A tilted coil installed concentric with the collar performs the same as a pair of straight coils in cancellation of the primary magnetic field. Two tilted coils 410-1 and 410-2 can be arranged to function similar to two pairs of coils. For the simplicity in data processing, two tilted coils can be installed orthogonal to each other, $R_x$ (410-1) facing in the x-direction, and $R_y$ (410-1) facing the y-direction.

Figure 9:
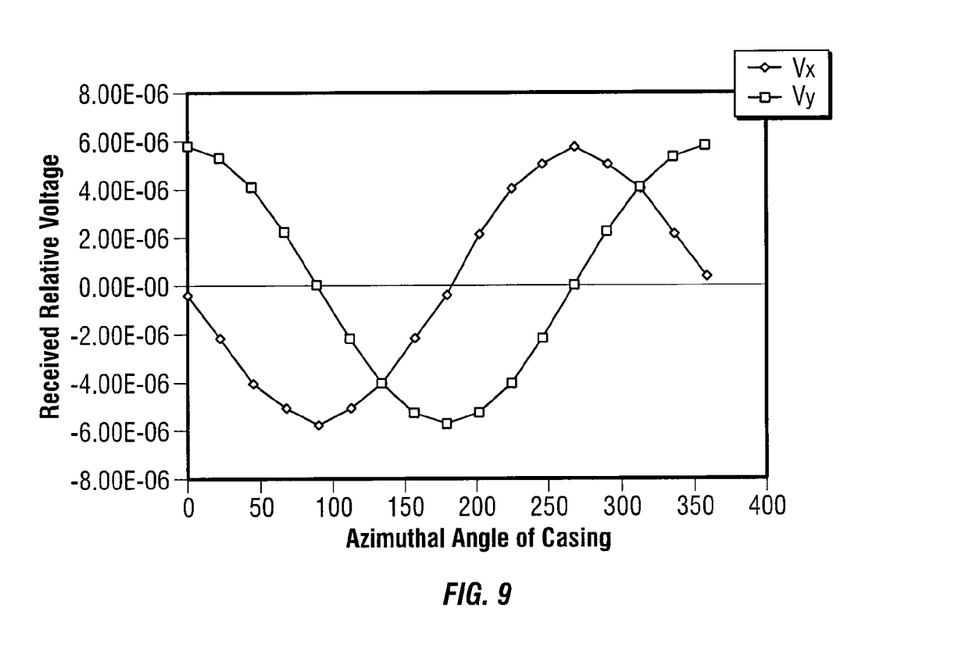
FIG. 9 shows modeled signals received by tilted coils $R_x$ and $R_y$, such as shown in FIG. 8, at various points of the tool arranged around a casing, in accordance with various embodiments.

FIG. 9 shows modeled signals received by the tilted coils $R_x$ (410-1) and $R_y$ (410-1), such as shown in FIG. 8, at various points of the tool arranged around a casing as conductive body 401. The signal from $R_x$ is referred to as $V_x$ that reflects the x-component of the magnetic field and the signal from $R_y$ is referred to as $V_y$, reflecting the magnitude of the y-component of the magnetic field. The curves in FIG. 9 show the real signal from the casing. The primary field has been cancelled by the symmetrical geometry of the tilted coil. Using the procedure described by equations 2 and 3 applied to the signals from the tilted receivers $R_x$ and $R_y$, the azimuthal angle and the distance to the casing can be determined in the similar way as discussed above with respect to the two pairs of coils. The use of two or more pairs of coils or a single pair of tilted receivers can be used for both casing detection and SAGD steering. In addition, a number of tilted receivers can be used in a tool to detect a conductive body and/or to provide SAGD steering.

Designs using at least two pairs of coil receivers to cancel the effect of the primary magnetic field or using a pair of tilted coil installed concentric with the collar on which it is attached can automatically cancel the strong primary signals generated by the currents on the collar. This cancellation significantly facilitates the extraction of the secondary magnetic fields transmitted by a conductive body, such as a casing, from the received total signal. A tool having receiver sensors arrangement according to the designs taught herein can be used on a non-rotational collar and on a rotational collar. The designs of the tools taught herein provide the capability of obtaining high reliability and sensitivity.

Figure 10:
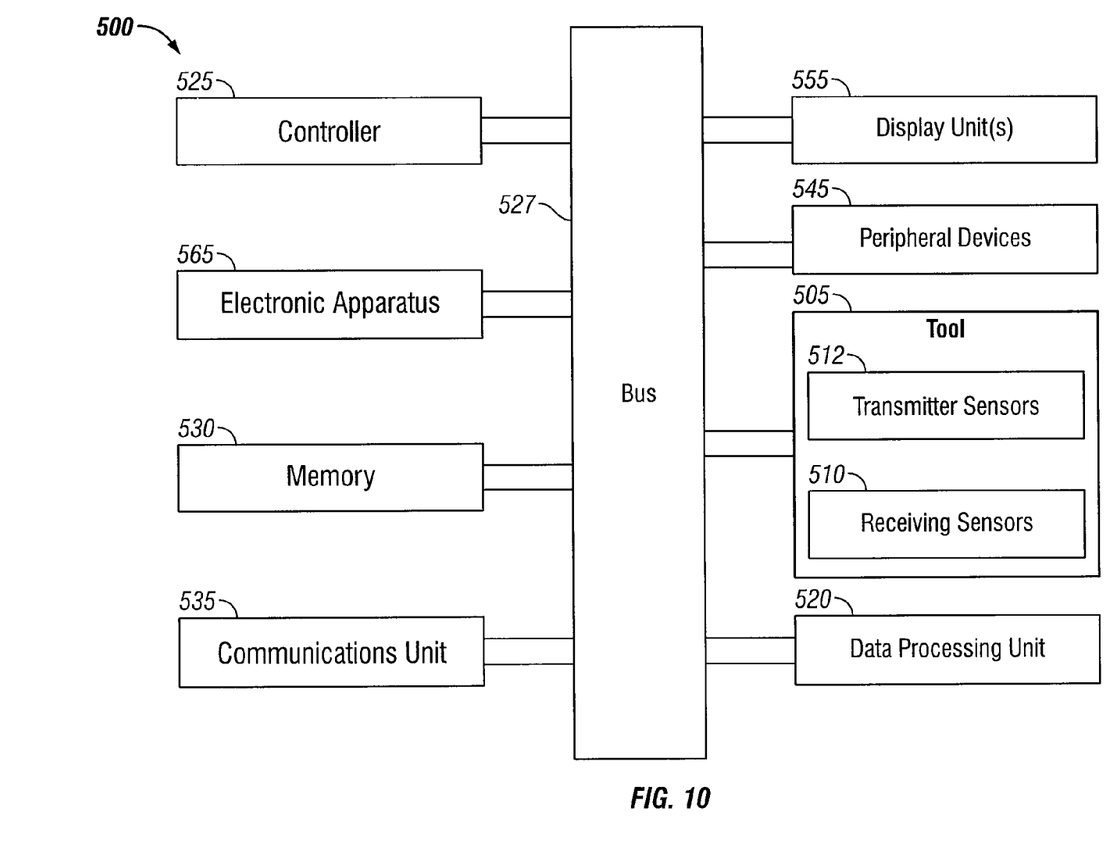
FIG. 10 depicts a block diagram of features of an example system having a tool configured with receiver sensors, in accordance with various embodiments.

FIG. 10 depicts a block diagram of features of an example embodiment of a system 500 having a tool 505 configured with sensors arranged such that receiver sensors 510 are arranged to substantially cancel a primary signal associated with a probe signal generated by a transmitter sensor 512 without rotating the receiver sensors 510 to cancel the primary signal and to capture a secondary signal generated from a conductive body below the earth's surface. The primary signal can be cancelled such that the primary signal is completely canceled or cancelled to a level that the primary signal is essentially cancelled. System 500 includes tool 505 having an arrangement of transmitter sensors 512 and receiver sensors 510 that can be realized in a similar or identical manner to arrangements of sensors discussed herein. System 500 can be configured to operate in accordance with the teachings herein.

System 500 can include a controller 525, a memory 530, an electronic apparatus 565, and a communications unit 535. Controller 525, memory 530, and communications unit 535 can be arranged to operate as a processing unit to control operation of tool 505 having an arrangement of transmitter sensors 512 and receiver sensors 510 and to perform one or more inversion operations on the signals collected by tool 505 to determine a distance of tool 505 to a conductive body, such as a casing or other piping, in a manner similar or identical to the procedures discussed herein. Such a processing unit can be realized using a data processing unit 520, which can be implemented as a single unit or distributed among the components of system 500 including electronic apparatus 565. Controller 525 and memory 530 can operate to control activation of transmitter sensors 512 and selection of receiver sensors 510 in tool 505 and to manage processing schemes in accordance with measurement procedures and signal processing as described herein. System 500 can be structured to function in a manner similar to or identical to structures associated with FIGS. 1-9.

Communications unit 535 can include downhole communications for appropriately located sensors. Such downhole communications can include a telemetry system. Communications unit 535 may use combinations of wired communication technologies and wireless technologies at frequencies that do not interfere with on-going measurements.

System 500 can also include a bus 527, where bus 527 provides electrical conductivity among the components of system 500. Bus 527 can include an address bus, a data bus, and a control bus, each independently configured or in an integrated format. Bus 527 can be realized using a number of different communication mediums that allows for the distribution of components of system 500. Use of bus 527 can be regulated by controller 525.

In various embodiments, peripheral devices 545 can include additional storage memory and/or other control devices that may operate in conjunction with controller 525 and/or memory 530. In an embodiment, controller 525 is realized as a processor or a group of processors that may operate independently depending on an assigned function. Peripheral devices 545 can be arranged with one or more displays 555, as a distributed component on the surface, that can be used with instructions stored in memory 530 to implement a user interface to monitor the operation of tool 505 and/or components distributed within system 500. The user interface can be used to input operating parameter values such that system 500 can operate autonomously substantially without user intervention.

Figure 11:
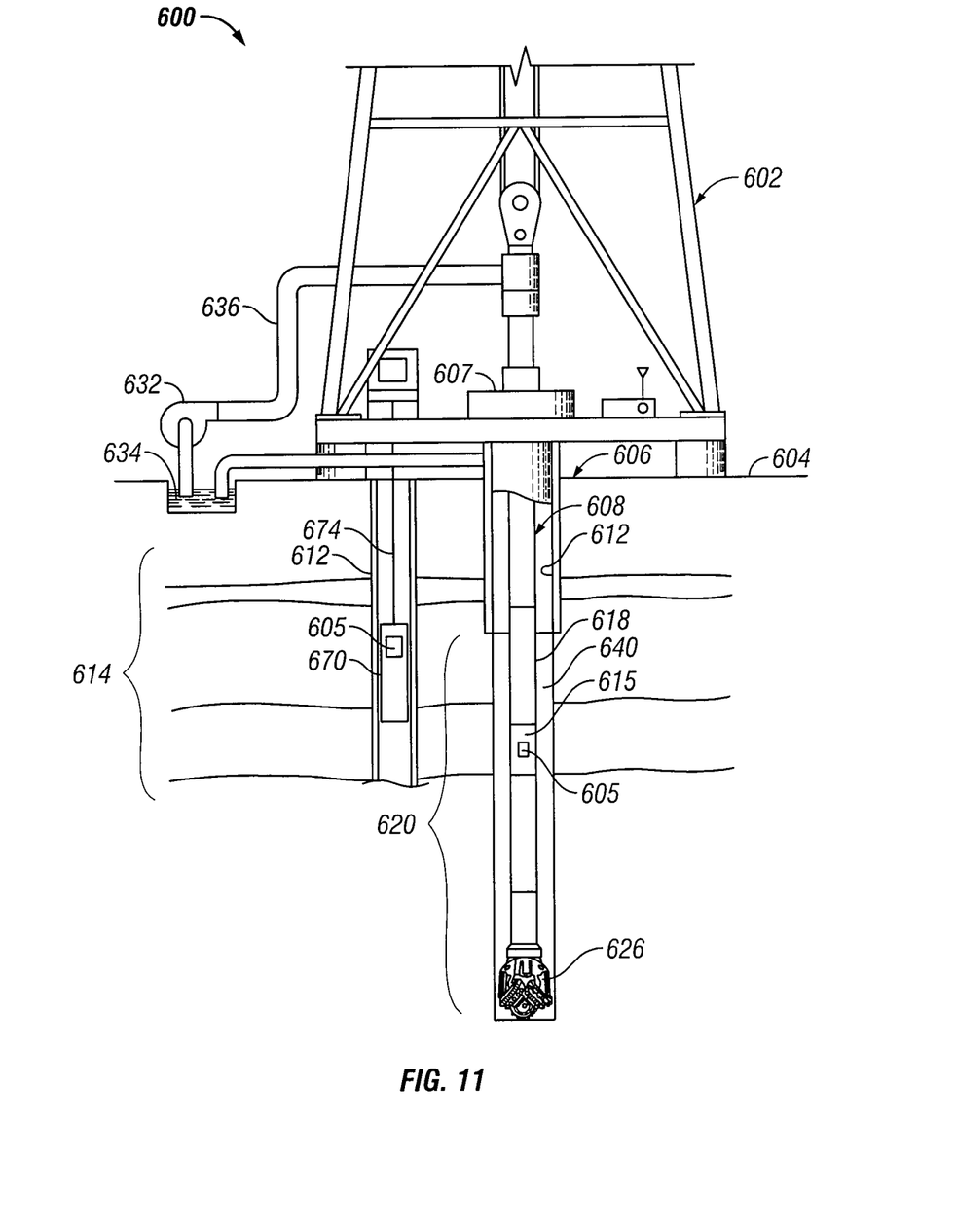
FIG. 11 depicts an example system at a drilling site, where the system includes a tool configured with receiver sensors, in accordance with various embodiments.

FIG. 11 depicts an embodiment of a system 600 at a drilling site, where system 600 includes a measurement tool 605 configured with sensors, the sensors arranged such that receiver sensors are arranged to substantially cancel a primary signal associated with a probe signal generated by a transmitter sensor without rotating the receiver sensors to cancel the primary signal and to capture a secondary signal generated from a conductive body below the earth's surface. The primary signal can be cancelled such that the primary signal is completely canceled or cancelled to a level that the primary signal is essentially cancelled. System 600 includes tool 605 having arrangements of transmitters and receivers that can be realized in a similar or identical manner to arrangements discussed herein.

System 600 can include a drilling rig 602 located at a surface 604 of a well 606 and a string of drill pipes, that is, drill string 608, connected together so as to form a drilling string that is lowered through a rotary table 607 into a wellbore or borehole 612. The drilling rig 602 can provide support for drill string 608. The drill string 608 can operate to penetrate rotary table 607 for drilling a borehole 612 through subsurface formations 614. The drill string 608 can include drill pipe 618 and a bottom hole assembly 620 located at the lower portion of the drill pipe 618.

The bottom hole assembly 620 can include drill collar 615, measurement tool 605 attached to drill collar 615, and a drill bit 626. The drill bit 626 can operate to create a borehole 612 by penetrating the surface 604 and subsurface formations 614. Measurement tool 605 can be structured for an implementation in the borehole of a well as a measurements-while-drilling (MWD) system such as a logging-while-drilling (LWD) system to detect a casing or other conductive body in another borehole or to provide SAGD steering. Measurement tool 605 can be structured for an implementation in an offshore environment. The housing containing measurement tool 605 can include electronics to activate transmitters of measurement tool 605 and collect responses from receivers of measurement tool 605. Such electronics can include a data processing unit to analyze signals sensed by measurement tool 605 and provide measurement results, such as distance and direction from tool 605 to a conductive body, to the surface over a standard communication mechanism for operating a well. Alternatively, electronics can include a communications interface to provide signals sensed by measurement tool 605 to the surface over a standard communication mechanism for operating a well, where these sensed signals can be analyzed at a processing unit at the surface.

In various embodiments, measurement tool 605 may be included in a tool body 670 coupled to a logging cable 674 such as, for example, for wireline applications. Tool body 670 containing measurement tool 605 can include electronics to activate transmitters of measurement tool 605 and collect responses from receivers of measurement tool 605. Such electronics can include a data processing unit to analyze signals sensed by measurement tool 605 and provide measurement results, such as distance and direction from tool 605 to a conductive body, to the surface over a standard communication mechanism for operating a well. Alternatively, electronics can include a communications interface to provide signals sensed by measurement tool 605 to the surface over a standard communication mechanism for operating a well, where these collected sensed signals are analyzed at a processing unit at the surface. Logging cable 674 may be realized as a wireline (multiple power and communication lines), a mono-cable (a single conductor), and/or a slick-line (no conductors for power or communications), or other appropriate structure for use in bore hole 612.

During drilling operations, the drill string 608 can be rotated by the rotary table 607. In addition to, or alternatively, the bottom hole assembly 620 can also be rotated by a motor (e.g., a mud motor) that is located downhole. The drill collars 615 can be used to add weight to the drill bit 626. The drill collars 615 also can stiffen the bottom hole assembly 620 to allow the bottom hole assembly 620 to transfer the added weight to the drill bit 626, and in turn, assist the drill bit 626 in penetrating the surface 604 and subsurface formations 614.

During drilling operations, a mud pump 632 can pump drilling fluid (sometimes known by those of skill in the art as "drilling mud") from a mud pit 634 through a hose 636 into the drill pipe 618 and down to the drill bit 626. The drilling fluid can flow out from the drill bit 626 and be returned to the surface 604 through an annular area 640 between the drill pipe 618 and the sides of the borehole 612. The drilling fluid may then be returned to the mud pit 634, where such fluid is filtered. In some embodiments, the drilling fluid can be used to cool the drill bit 626, as well as to provide lubrication for the drill bit 626 during drilling operations. Additionally, the drilling fluid may be used to remove subsurface formation 614 cuttings created by operating the drill bit 626.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
   generating a probe signal into a formation below the earth's surface from a transmitting sensor of a tool disposed below the earth's surface;
   receiving voltage signals in receiving sensors of the tool in response to generating the probe signal, the receiving sensors arranged in pairs to substantially cancel a magnetic field of a primary signal associated with the probe signal without rotating the receiving sensors to cancel the magnetic field of the primary signal and to capture a magnetic field of a secondary signal generated from a conductive body being a structure other than the formation and the tool, wherein the receiving sensors include two tilted sensors such that the two tilted sensors are arranged non-perpendicular to a longitudinal axis of the tool and oriented; and
   determining an azimuthal angle associated with the conductive body using the voltage signals and a distance to the conductive body determined using a magnitude of the voltages signals, formation resistivity, and dielectric constant.

2. The method of claim 1, wherein generating the probe signal from the transmitting sensor includes using an electric dipole source to induce an electric current in a region outside the tool.

3. The method of claim 1, wherein receiving signals in receiving sensors of the tool includes using two sets of non-parallel antennas as receiver sensors.

4. The method of claim 1, wherein the method includes positioning the tool approximately parallel to the conductive body.

5. The method of claim 1, wherein determining the azimuthal angle and the distance includes determining the azimuthal angle and the distance, while the tool is mounted on a non-rotational collar.

6. The method of claim 1, wherein the tilted sensors are installed concentrically on a collar on which the tool is mounted.

7. The method of claim 6, wherein the tilted sensors are oriented orthogonal to each other.

8. The method of claim 1, wherein determining the azimuthal angle and the distance includes determining characteristics of the conductive body.

9. The method of claim 8, wherein determining characteristics of the conductive body includes whether the conductive body is a casing associated with a well.

10. A non-transitory machine-readable storage device having instructions stored thereon, which, when performed by a machine, cause the machine to perform operations, the operations comprising:
generating a probe signal into a formation below the earth's surface from a transmitting sensor of a tool disposed below the earth's surface;
receiving voltage signals in receiving sensors of the tool in response to generating the probe signal, the receiving sensors arranged in pairs to substantially cancel a magnetic field of a primary signal associated with the probe signal without rotating the receiving sensors to cancel the magnetic field of the primary signal and to capture a magnetic field of a secondary signal generated from the conductive body being a structure other than the formation and the tool, wherein the receiving sensors include two tilted sensors such that the two tilted sensors are arranged non-perpendicular to a longitudinal axis of the tool and oriented; and
determining an azimuthal angle associated with the conductive body using the voltage signals and a distance to the conductive hod determined using a magnitude of the voltages signals, formation resistivity, and dielectric constant.

11. The non-transitory machine-readable storage device of claim 10, wherein generating the probe signal from the transmitting sensor includes using an electric dipole source to induce an electric current in a region outside the tool.

12. The non-transitory machine-readable storage device of claim 10, wherein receiving signals in receiving sensors of the tool includes using two sets of non-parallel antennas as receiver sensors.

13. The non-transitory machine-readable storage device of claim 10, wherein receiving signals in receiving sensors of the tool includes using the tilted sensors installed concentric on a collar on which the tool is mounted.

14. The non-transitory machine-readable storage device of claim 10, wherein the tilted sensors are oriented orthogonal to each other.

15. The non-transitory machine-readable storage device of claim 10, wherein the instructions include instructions to position the tool approximately parallel to the conductive body.

16. The non-transitory machine-readable storage device of claim 10, wherein determining the azimuthal angle and the distance includes determining the azimuthal angle and the distance, while the tool is mounted on a non-rotational collar.

17. The non-transitory machine-readable storage device of claim 10, wherein processing the received signals includes determining characteristics of the conductive body.

18. The non-transitory machine-readable storage device of claim 17, wherein determining characteristics of the conductive body includes whether the conductive body is a casing associated with a well.

19. A system comprising:
a transmitter sensor and receiver sensors disposed on a structure, the receiver sensors including two tilted sensors arranged such that the two tilted sensors are non: perpendicular to a longitudinal axis of the structure and oriented, the two tilted sensors to operate as a pair to substantially cancel a magnetic field of a primary signal associated with a probe signal generated by the transmitter sensor into the formation without rotating the receiver sensors to cancel the magnetic field of the primary signal and to capture a magnetic field of a secondary signal generated from a conductive body in the formation below the earth's surface, the conductive body being different from the formation, the conductive body separate from the structure;
a control unit operable to manage generation of the probe signal from the transmitter sensor and to manage collection of received voltage signals at the receiver sensors; and
a data processing unit to determine an azimuthal angle associated with the conductive body using the voltage signals and a distance to the conductive body using a magnitude of the voltage signals, formation resistivity and dielectric constant.

20. The system of claim 19, wherein the transmitter sensor includes a focused electric dipole source to induce an electric current in a region exterior to the structure.

21. The system of claim 19, wherein the receiver sensors include two sets of coil antennas such that the two sets are non-parallel.

22. The system of claim 19, wherein the receiver sensors includes two sets of non-parallel coil antennas such that each pair of the two sets of non-parallel coil antennas are symmetrically installed with respect to a plane that is aligned with a longitudinal axis of the structure.

23. The system of claim 19, wherein the system includes a machine: readable storage device having instructions stored thereon, which, when performed by the system, cause the system to perform operations, the operations comprising operations to:
generate the probe signal from the transmitter sensor disposed below the earth's surface;
receive signals in the receiver sensors in response to generating the probe signal; and
process the received signals to determine the position of the conductive body.

24. The system of claim 19, wherein the transmitter sensor, the receiver sensors, the control unit, and the data processing unit are operatively positioned approximately parallel to the conductive body.

25. The system of claim 19, wherein the data processing unit is arranged to determine the azimuthal angle and the distance while the tool is mounted on a nonrotational collar.

26. The system of claim 19, wherein the tilted sensors are installed concentrically on the structure.

27. The system of claim 26, wherein the tilted sensors are oriented orthogonal to each other.

28. The system of claim 19, wherein the data processing unit is arranged to operatively determine characteristics of the conductive body.

29. The system of claim 28, wherein the characteristics of the conductive body include whether the conductive body is a casing associated with a well.

\* \* \* \* \*

UNITED STATES PATENT AND TRADEMARK OFFICE
CERTIFICATE OF CORRECTION

PATENT NO. : 9,810,805 B2
APPLICATION NO. : 13/818380
DATED : November 7, 2017
INVENTOR(S) : Michael S. Bittar and Jing Li It is certified that error appears in the above-identified patent and that said Letters Patent is hereby corrected as shown below:

In the Claims

Column 12, Line 9, "non: perpendicular," should read -- non-perpendicular --.

Column 12, Line 43, "machine: readable," should read -- machine-readable --.

Signed and Sealed this
Twenty-third Day of January, 2018

Joseph Matal
*Performing the Functions and Duties of the
Under Secretary of Commerce for Intellectual Property and
Director of the United States Patent and Trademark Office*